UNITED STATES PATENT OFFICE.

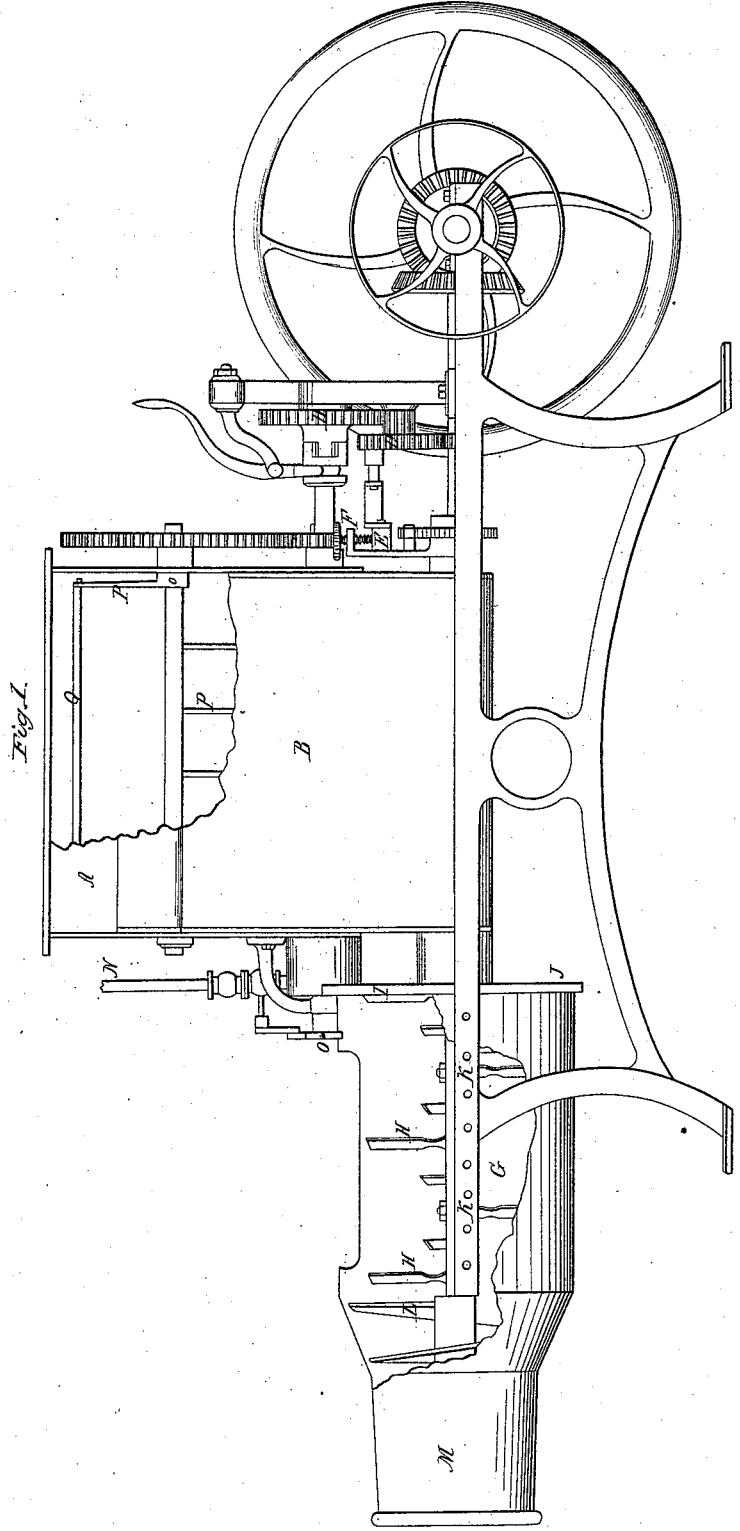

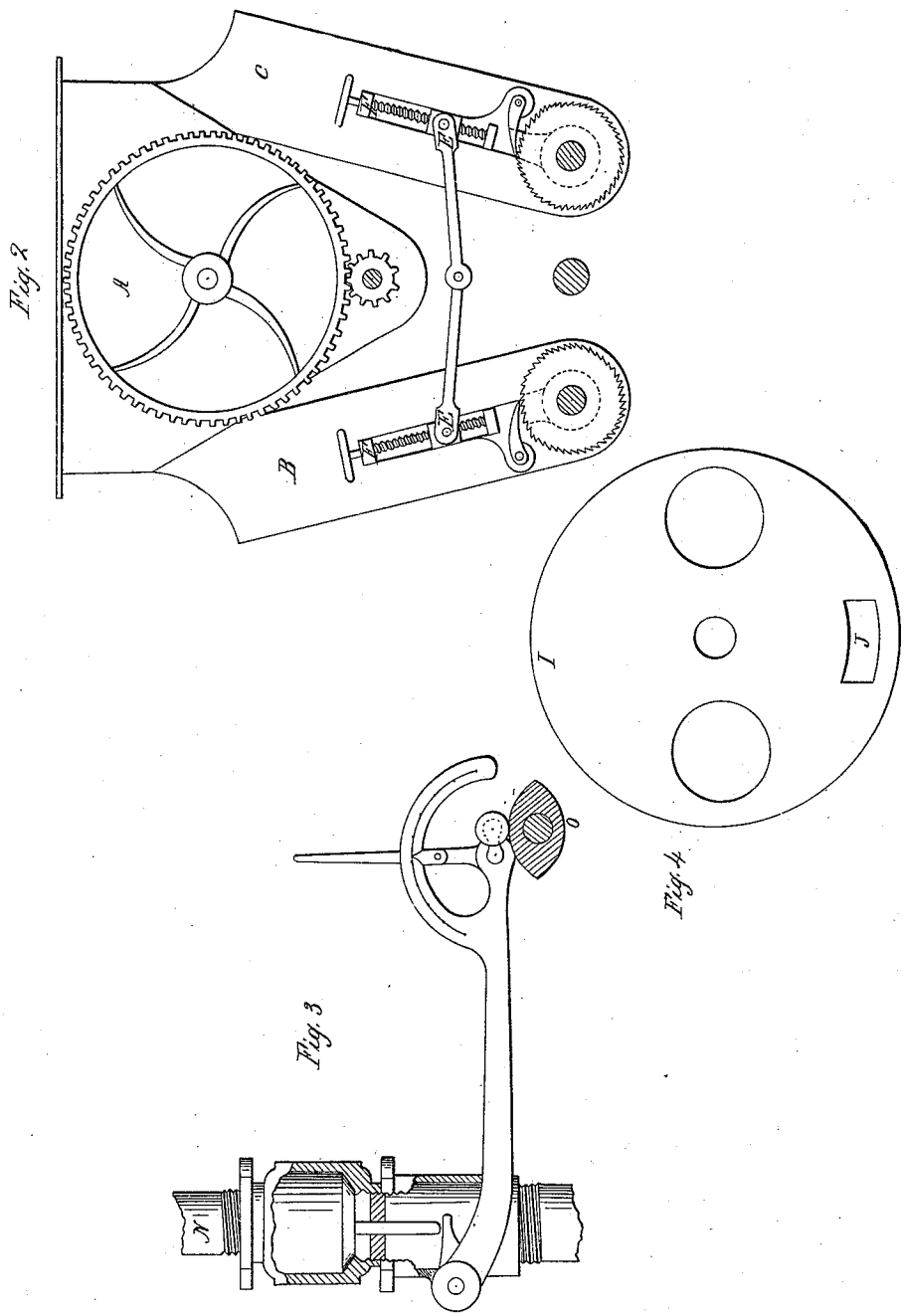

WILLIAM HOTINE, OF BROOKLYN, NEW YORK.

IMPROVED MACHINE FOR MIXING DOUGH.

Specification forming part of Letters Patent No. 31,082, dated January 8, 1861.

*To all whom it may concern:*

Be it known that I, WILLIAM HOTINE, of the city of Brooklyn, Long Island, State of New York, have invented a machine for feeding the various materials used in the composition of all kinds of breadstuffs and mixing the same into dough of any required consistence; and I do hereby declare that the following is a full and clear description thereof, reference being had to the accompanying drawings, in which—

Figure 1 is a side elevation. Fig. 2 is a transverse section taken at the point intersected by the dotted line, and Fig. 3 is a transverse section taken at the point indicated by the arrow.

The same letters refer to like parts in all.

The object of my invention is to improve the manufacture of all kinds of bread and crackers by a good and practical machine that will also effect a great saving of labor and promote cleanliness by superseding the necessity of hand-labor in the mixing; and its general feature consists of its comprehensive utility and advantageous mode of working by obviating the necessity of using any great amount of power, which is well known to be injurious. To this end each material is fed through a separate channel into the mixing-trough in the proportions required, and by being mixed by small portions in a continuous manner induces by such gentle treatment a beneficial result. Further, the fact of feeding in such manner presents facilities for using certain of the ingredients in a form or condition (though much desired) usually found impracticable in hand-labor. For instance, butter or lard may by means of this machine be used cold or hard—a state which is well known to be conducive to good quality.

A B C, (shown fully in transverse section,) Fig. 2, are hoppers for containing, respectively, flour, butter or lard, and sugar, in each of which is a screw-conveyer of common form for the purpose of feeding the materials into the mixing-trough. The respective proportions of each are adjusted and regulated, first, of the flour A, by a set of gear-wheels, D D, calculated to a set speed and furnished with a clutch apparatus to throw the feed on or off; second, of the butter and sugar, by ordinary ratchet-wheels and pawls made variable in their extent of motion by the device shown in Fig. 2, wherein the point of power E on the lever F can be varied in its relative distance from the fulcrum by the adjusting-screw and hand-wheel shown, and by which it can also be readily adjusted while in motion.

In Fig. 1, G is the mixing-trough for the reception of the various materials, and H H are a series of knives or blades arranged spirally around a horizontal shaft, which by their revolution take up and carry progressively forward and mix together the ingredients as they issue from their several openings in the circular plate I, forming one end of the trough, the first knife in the series cutting or scraping off the same at each turn.

Fig. 4 is a transverse section of machine taken at the point I, and represents the openings in the head of trough or plate I, through which the materials are fed, of which the lower one, J, is used for feeding the sponge or leaven, the quantity being regulated by a gate. The hopper or vessel containing the same I do not deem it necessary to show, as it need not form any part of the machine. The row of pins or detents K K are so placed as to occupy the intermediate spaces between the planes of revolution performed by the blades, and serve the purpose of facilitating the mixing of the soft dough by their resistance, and to prevent the dough from being carried over the shaft. These pins are merely set tight in their holes, but are capable of being moved in or out to any position, thereby materially affecting the degree of mixing. Near the termination of the blades, and on the end of the shaft, is what I term the "packer" L. It consists of a plate cut in one of its radial lines and wound round a hub or cylinder, so as to form in its general feature a conical screw of one thread. Its office is to take up the dough as it is mixed by the blades and press it through the mouthpiece M, which being slightly tapered in its length affords by its resistance the means of packing the dough into a solid mass. This is important in some kinds of dough, as it puts it in a form or condition for after manipulation with facility.

I desire to be understood that I do not confine myself to the use of the precise form of packer as above described, as other forms or modifications of the same will answer the purpose—as, for instance, it may be composed of two threads of the same general form and effect; or the form may be varied to a screw or spirally-twisted plate of a cylindrical shape; and the same remarks may also be applied to the form of the mouth-piece, which may be either a cylinder or in the form of the frustum of a cone. The water, yeast, or other fluid is admitted from any convenient vessel into the mixing-trough through the pipe N, in which is placed a check-valve operated by a trip motion from the cam O, and is capable of being adjusted in its feed and proportion while in motion by the device shown in Fig. 3. There is also a shaft inside the hopper A, to which are attached radial arms and fingers P P, and a connecting-bar, Q, which by its revolutions through the flour keeps it in a condition to freely feed the conveyer by preventing it from packing.

I claim—

The combination and arrangements of the feeding devices in hoppers A B C, the face-plate I, the mixing devices, and packer L in the trough G, substantially as and for the purpose specified.

WILLIAM HOTINE.

Witnesses:
CHARLES WÖHRLE,
JAMES PARKER.